3,069,354
PROCESS FOR REMOVING PHENOL FROM A
PHENOL-CONTAINING OIL
Walter Höringklee, Leuna, Kreis Merseburg, Germany, assignor to VEB Leuna-Werke "Walter Ulbricht," Leuna, Krs. Merseburg, Germany
Filed May 22, 1959, Ser. No. 815,066
Claims priority, application Austria July 11, 1958
3 Claims. (Cl. 202—263)

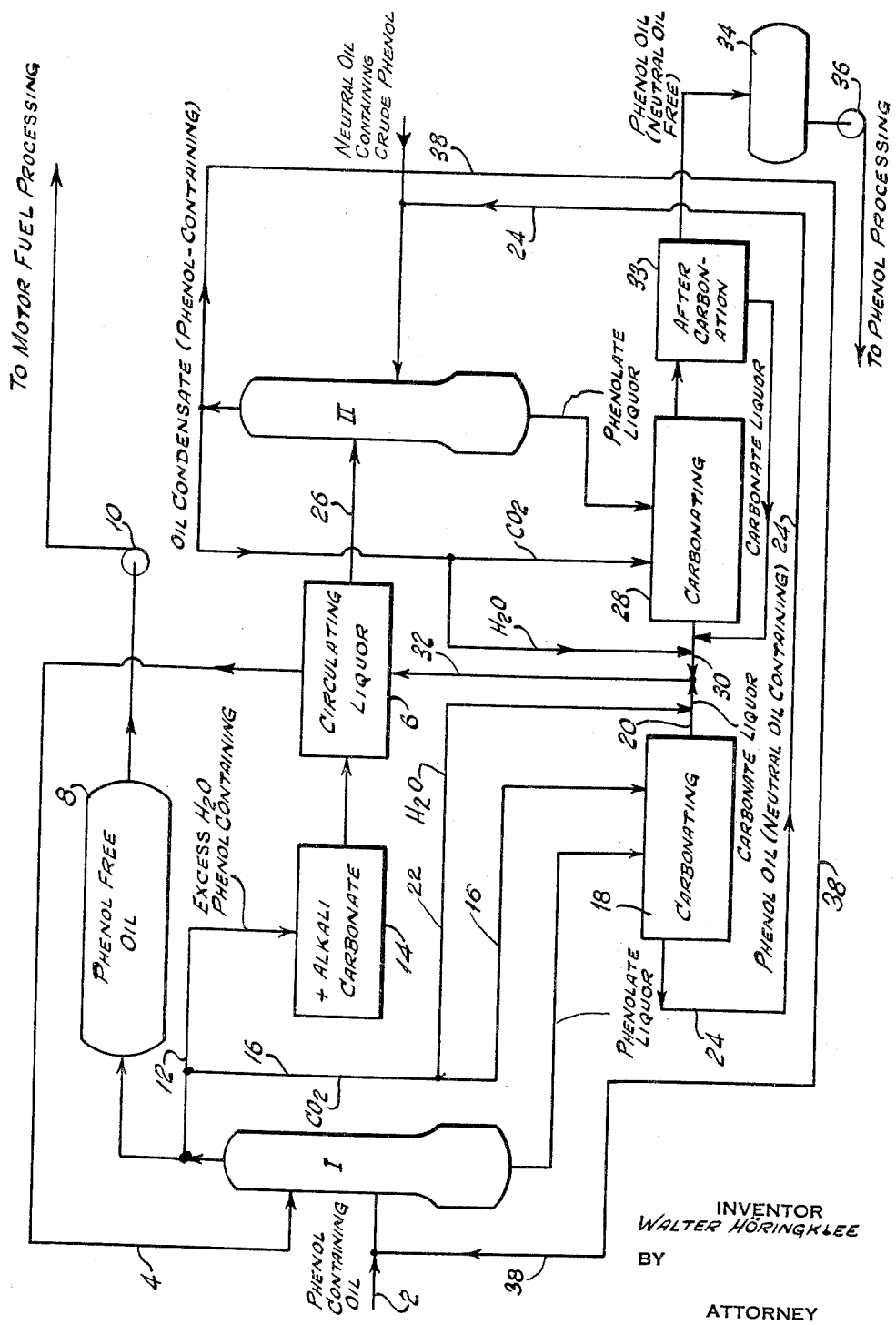

This invention relates to a continuous process for recovering phenols from phenol-containing liquids. Phenols are recovered on a large scale in low temperature carbonizing installations, coking plants, hydrogenating plants and mineral oil factories by separation from phenol-containing tars and oils as well as from phenol waters.

The sodium hydroxide process is generally used for the separation of the phenols from tars and oils. In this process the phenolic components are extracted with the sodium hydroxide solution. The phenolate liquor obtained is then "steam cleaned" with water vapor until the dissolved neutral oils are removed and then treated with $CO_2$ gas. In this process the free phenols are obtained in the form of a crude phenol oil and an aqueous soda solution, the so-called carbonate liquor. The crude phenol oil is processed into the desired phenol products while the carbonate liquor is regenerated by treatment with roasted lime into sodium hydroxide. The latter is introduced into the process again after separation of slaked lime.

This sodium hydroxide process, however, exhibits certain disadvantages. These lie particularly in the laborious regeneration of the carbonate liquor which is quite expensive. Therefore, there has been no dearth of suggestions for replacing the sodium hydroxide with more easily regeneratable salt solutions or with selective solvents.

The Phenosolvan process has obtained significant acceptance in the art for recovering phenols from the phenol water. This process is based on an extraction of the phenolic waters with an ester mixture consisting essentially of butyl acetate. The phenol-containing extract solution thus obtained is processed by distillation. In this distillation the butyl acetate is removed and there remains behind a phenol oil which still contains several percent of neutral oil that cannot be separated by distillation. This neutral oil content of the Phenosolvan extract prevents the direct processing to the desired pure phenol products and necessitates a special oil removal step. This was previously attained most safely by redissolving the Phenosolvan extract in sodium hydroxide followed by a "steam-cleaning" step of the phenolate liquor so formed. To separate the phenols from this liquor it is then necessary to carbonate it. Carbonate liquor is then collected which is subjected to treatment with a caustic in the usual manner for the purpose of regeneration. The working steps are therefore approximately the same as in the above-described sodium hydroxide procedure and, thus, this method of oil removal also brings with it the same disadvantages.

A significant advance over the procedures above described was achieved by the so-called "soda-pressure" procedure (R. Bemmann, Chemical Technique, vol. 8, No. 10, pp. 578–579, 1956; Freiberg Research Pamphlets, A 51, pp. 89–105, 1956; see also German Patent 1,005,080, Australian Patent 207,666; Belgian Patent 542,919; French Patent 1,136,187; Polish Patent 40,191; Spanish Patent 228,517; South African Patent 3786/55). This avoids the disadvantageous procedure of the caustic treatment step. The process is applicable to the separation of the phenols from phenol-containing oils as well as for the oil removal of neutral oil-containing crude phenol oils. It utilizes the fact that an aqueous soda solution splits into NaOH and $CO_2$ under pressure and increased temperatures in a continuous process which operates practically without consumption of chemicals. The oil to be freed of phenol, or the phenol oil to be freed of oil, is treated in a column under pressure and at increased temperature with an approximately 10% soda solution. Under the operating conditions, the soda splits in the manner stated and the sodium hydroxide formed reacts with the phenols to form phenolate liquor. This collects in the bell of the column where it is heated indirectly. The water vapor formed in this causes a "clean steaming" of the phenolate liquor. If, as in the case of the phenol removal from an oil, there is a large excess of neutral oil present, this process can be supplemented by blowing steam into the sump. The neutral oil vapors and the water vapor pass over the head of the column together with the carbonic acid produced in the process and condense in a cooler. The neutral oil and condensate water are collected and separated in a separatory container by reducing the pressure. The carbonic acid separated on reducing the pressure is used to carbonate the phenolate liquor withdrawn continuously from the bell. The carbonate liquor so formed after combination with the condensate water that has passed over the head is returned to the process in place of alkali carbonate solution.

The separation of phenols and neutral oils is simplified very much by this procedure. It operates completely continuously and the annoying caustic treatment procedure is eliminated. Also none of the auxiliary substances need be supplied from outside the system ($CO_2$ and caustic lime) anymore; only an energy supply in the form of steam is required. Instead of soda solution another suitable alkali carbonate solution can also be used in the procedure.

In the operation of such installations experience has shown that in the case of the phenol removal from phenol-containing oils, it is not always possible to obtain a sufficiently neutral oil-free phenolate liquor. Moreover, a large quantity of phenol water is collected which is produced through the direct blowing of steam into the columns. On the other hand, it was found that in the oil removal from Phenosolvan extracts by this procedure, considerable quantities of phenols are contained in the condensate oil.

It has now been found that these disadvantages may be avoided and that the process can be made more economical and effective by the operation of two pressure columns using the technique of the "soda pressure" process, wherein one column is used to separate oil from the phenol-containing oil and wherein the second column is coupled with the first column and is used to separate the neutral oils from phenolate liquor produced in the first column. More particularly, in accordance with the present invention, it has been found that the disadvantages of the prior art processes can be avoided and the "soda pressure" procedure which is carried out using alkali carbonate solution (preferably soda solution) under increased pressure and at temperatures above 100° C., can be made more economical and effective if two pressure columns are employed working side by side according to this principle, in one of which the phenol removal from phenol-containing oils is undertaken and in the other the oil removal from neutral oil-containing phenol oil, and if one couples them to each other in the following manner: the soda solution needed in both columns is led in a common cycle and the neutral oil-containing phenol oils collected in the phenol-removing column as well as the phenol oil-containing condensate oils collected in the oil removal column are in each case processed further in the other column.

The procedure according to the invention, therefore, permits preparing a phenol-free oil from a phenol-containing oil, and freeing a neutral oil-containing phenol oil of neutral oil, whereby both starting products can be processed simultaneously.

It is accordingly an object of the present invention to provide an improved process for separating phenol from phenol-containing oil using basically the "soda-pressure" process but providing an improvement therein resulting in the avoidance of the disadvantages inherent in said "soda-pressure" process, and to increase the effectiveness and improve the economy of this process.

Other and more detailed objects will be apparent from the following description and claims.

Referring to the drawings, there is illustrated a schematic system for carrying out the present invention; columns I and II are two pressure columns which are operated in accordance with the above-described "soda-pressure" procedure.

Column I is operated at a pressure of about 10 atmospheres and at a temperature of about 180° C. The phenol-containing oil such as a medium heavy oil having a phenol content of about 15 to 20% is introduced into pressure column I by means of line 2. Sodium carbonate solution is introduced into column I by line 4. The sodium carbonate solution introduced by line 4 is obtained from storage tank 6 which stores the circulating carbonate liquor. In column I, as a result of the pressure and temperature therein, the aqueous sodium carbonate solution dissociates in accordance with the following equation:

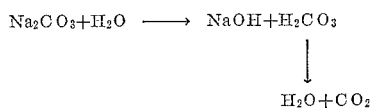

The sodium hydroxide produced in this reaction reacts with the phenol contained in the oil to form the sodium phenolate solution. The volatile materials such as the phenol-free oil, carbon dioxide and some phenol-containing water distill from pressure column I and are collected or recycled. Thus, the phenol-free oil is collected in tank 8 from which it may be pumped by means of pump 10 to a motor fuel processing plant. Some water containing phenol which distills from column I is conducted by line 12 to container 14 where it may be mixed with fresh alkali carbonate. The $CO_2$ gas is lead by means of line 16 to a carbonating chamber 18 described in more detail below. Water from the pressure tank I is also introduced into line 20 carrying carbonate liquid from carbonating container 18 by means of line 22.

The phenolate liquor produced in pressure tank column I is collected in carbonating chamber 18 where it is carbonated by $CO_2$ entering the carbonating chamber by means of line 16. The purpose of the carbonating procedure is to convert the sodium phenolate produced in pressure column I to free phenol. This reaction is illustrated by the following equation:

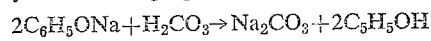

The crude phenol-containing neutral oils are separated from the carbonate liquor in carbonating chamber 18, the crude phenol being conveyed by means of line 24 to pressure column II. The carbonate liquor is conducted by line 26 to storage tank 6. During its course, this carbonate liquor, as described above, is diluted with water entering line 20 by means of line 22.

As noted above, the crude phenol-containing neutral oil is introduced into pressure column II by means of line 24. Circulating carbonate liquor is tapped from the carbonate circulating storage tank 6 by means of line 26 and introduced into pressure column II. The neutral oil-containing phenol is treated in pressure column II with the circulating liquor under substantially the same conditions as those employed in pressure column I. Here the neutral oils are substantially distilled from the crude phenol together with $CO_2$ and water. These are separated, the $CO_2$ being returned to a second carbonating chamber 28 and the water being returned to line 30 for storage in circulating liquor storage tank 6.

The phenolate product from pressure column II is carbonated in second carbonating chamber 28. The carbonate liquor formed in chamber 28 is conveyed by means of line 30 and line 32 to circulating liquor storage tank 6. The phenol containing liquor is conducted from the second carbonating chamber 28 to an after carbonating treatment in container 33. Here the phenol oil free of neutral oil is conveyed to storage tank 34 and then pumped to a further phenol processing unit, not shown, by means of pump 36. The oil condensate leaving second pressure tank II contains some phenol which is recycled by line 38 to phenol feed line 2 where it is reintroduced into pressure column I.

As described above, the water condensate containing excess phenol which leaves column I and is carried by line 12 is not introduced into the circulating liquor as such. It is, however, used to make up fresh soda solution which is needed to compensate for the small losses in circulating liquor.

The present process is by no means limited to the simultaneous processing of the two starting products. The installation described can also be operated when the supplying of one or other starting product is occasionally stopped.

Finally the process can be used only when one of the two products is to be processed. Then for the purpose of phenol removal from a phenol-containing oil the latter is freed of phenol in the one of the two pressure columns, the neutral oil-containing phenol oil collected in this process is freed of oil in the second column operating by the same principle, and the phenol-containing condensate oil separated in this again led to the phenol removing column for the separation of the phenols.

If a neutral oil-containing phenol oil is to be merely freed of neutral oil, then this phenol is freed of oil in one of the two columns, the phenol-containing condensate oil collecting in this process is freed of phenol in the second column operating by the same principle, and the neutral oil-containing phenol oil separated in this led to the oil removing column again for the purpose of separating the neutral oils.

In these cases, the second column in each case, which serves either for the oil removal of the phenol oil produced in the phenol removal from the oil, or else for the phenol removal from the condensate oil collected in the oil removal from the phenol, is dimensioned correspondingly smaller.

Columns I and II can be operated over a wide range of conditions. Thus, the temperature in each column can be maintained in the range of 160° C. to 220° C. The pressure can also be varied considerably in the columns. By way of illustration, they can range from 6 to 24 atmospheres of pressure.

Similarly the rate of feeding the crude phenol containing liquid to the system varies. In general, the crude phenol containing liquids are fed at a rate of about 200 to 400 liters per hour.

The present process is applicable to the processing of a wide variety of phenol containing liquids, particularly oils. Among the products that may be treated may be mentioned:

In the phenol separation column, for instance, carbolic oil, medium heavy oil from hydrogenation plants, light oil from lignite coking.

In the oil separation column 5, for instance, crude phenols containing neutral oils, Phenosolvan extracts.

The following examples are further illustrative of the present invention. It is to be understood, however, that the invention is not limited thereto.

*Example 1*

Two pressure columns used in the conventional pressure-soda process for recovering phenol from phenol containing oils were run at a sump temperature of 180° C. and a pressure of 10 atmospheres. One of the two pressure columns (the phenol separating column I) was fed hourly 300 liters of medium heavy oil containing 18.6% phenol and obtained from a lignite hydrogenation process, and 400 liters of a 10% soda solution obtained from the cyclic liquor storage container which collects liquor from both columns. Into the other column (the oil separating column II) was fed hourly 400 liters of crude phenol oil containing 2.2% neutral oil and 1600 liters of the 10% soda solution circulating liquid. In both columns the "pressure soda process" proceeds. The phenols are separated as phenolate liquor and the steam resulting from the heating of the liquid injected into the columns draws the non-phenolic portion of the starting product overhead. From phenol separating column I, 280 liters per hour of de-phenolated medium heavy oil are obtained which still contain a residual phenol content of 1.7% consisting of cresols and xylylols. This is converted into a motor fuel by a subsequent hydrogenation treatment. The phenolate liquor resulting from the phenol separating step is carbonated with the aid of the carbonic acid which is vented from column I. The phenol oil obtained in this manner contains 2.9% neutral oil.

Because of its high neutral oil content, this product is unsuitable for working up to a phenol product. For this reason, the crude phenol oil is subjected to a continuous de-oiling step in column II.

A practically neutral oil-free phenolate liquor is drawn off from de-oiling column II. This is carbonated with the help of the carbonic acid which is vented from this column and then subjected to an after carbonation treatment. There results a neutral oil-free phenol oil which can be directly worked up to a product of standard purity. The oil condensate, which is obtained from the head of the column in quantities of 20 l./h. and contains 45% of phenolic constituents, is recycled to the oil which is being continuously introduced into dephenolating column I.

The water of condensation obtained from the head of each column (column I—180 l./h., column II—200 l./h.) is separated from the oil condensate and is continuously added to the concentrated soda solution (carbonate liquor) which is separated from the carbonated or after carbonated phenolate liquor. The soda solution recovered reaches the common circulating liquor storage container from where it is introduced into the columns anew.

If the steam clarification step in column I is to be supplemented by the direct introduction of steam, which at most will be in quantities of 20–30 kg./l., the dilution of the circulating liquor will be compensated for by conducting a corresponding quantity of water of condensation to a separate container where it is used to prepare fresh soda solution.

Following the same procedure outlined above, any of the crude phenol-containing liquids mentioned above may be treated.

While the invention has been described with particular reference to specific embodiments, it is to be understood that it is not limited thereto, but is to be construed broadly and restricted solely by the scope of the appended claims.

What is claimed is:

1. A process for removing phenol from an oil containing the same and of removing oil from phenol containing the same which comprises establishing a first and second pressure zone and an alkali carbonate liquor storage zone, maintaining said first and second pressure zones at elevated pressures from 6–24 atmospheres and at temperatures above from 160–220° C., introducing said oil which contains some phenol into said first pressure zone, conveying alkali carbonate solution from said storage zone into said first pressure zone whereby a reaction is caused to take place in said zone forming a first phenolate liquor while oil free from phenol, $H_2O$ and $CO_2$ are distilled off, carbonating said first phenolate liquor, whereby a first carbonate liquor layer and a first phenol liquor layer containing some neutral oils are formed, separating said two layers, conveying said first phenol liquor with the neutral oil therein to said second pressure zone, conveying said first carbonate liquor layer to said storage zone, conveying alkali carbonate solution from said storage zone to said second pressure zone, wherein it encounters and reacts with said first phenol liquor layer containing neutral oil, whereby a second phenolate liquor is formed and neutral oils, $CO_2$ and $H_2O$ are distilled from said second pressure zone, and are returned to said first pressure zone, carbonating said second phenolate liquor, whereby a second phenol liquor-containing layer and a second carbonate liquor layer are formed, separating said layers and conveying said second carbonate liquor layer to said storage zone.

2. A process according to claim 1 wherein $CO_2$ distilling from said first and second pressure zones is used respectively to carbonate said first and second phenolate liquor.

3. A process according to claim 1, wherein condensed water obtained from distillation in said first pressure zone is employed to make up fresh alkali carbonate liquor for use in the circulating liquor system.

References Cited in the file of this patent

UNITED STATES PATENTS

| | | |
|---|---|---|
| 1,944,681 | Cooper | Jan. 23, 1934 |
| 2,203,217 | Hund et al. | June 4, 1940 |
| 2,246,376 | Lynch | June 17, 1941 |